United States Patent
Hinton et al.

(10) Patent No.: US 9,594,648 B2
(45) Date of Patent: Mar. 14, 2017

(54) CONTROLLING NON-REDUNDANT EXECUTION IN A REDUNDANT MULTITHREADING (RMT) PROCESSOR

(75) Inventors: Glenn J. Hinton, Portland, OR (US); Steven E. Raasch, Shrewsbury, MA (US); Sebastien Hily, Hillsboro, OR (US); John G. Holm, Beaverton, OR (US); Ronak Singhal, Portland, OR (US); Avinash Sodani, Portland, OR (US); Deborah T. Marr, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1399 days.

(21) Appl. No.: 12/317,802

(22) Filed: Dec. 30, 2008

(65) Prior Publication Data

US 2010/0169628 A1 Jul. 1, 2010

(51) Int. Cl.
G06F 9/38 (2006.01)
G06F 11/16 (2006.01)
G06F 9/30 (2006.01)

(52) U.S. Cl.
CPC ...... *G06F 11/1683* (2013.01); *G06F 9/30189* (2013.01); *G06F 9/3851* (2013.01); *G06F 9/3857* (2013.01); *G06F 9/3861* (2013.01); *G06F 9/3891* (2013.01); *G06F 11/1641* (2013.01); *G06F 11/1658* (2013.01)

(58) Field of Classification Search
CPC .............................. G06F 9/3851; G06F 9/3861
USPC ................................................. 712/244, 229
See application file for complete search history.

(56) References Cited

U.S. PATENT DOCUMENTS

| | | | |
|---|---|---|---|
| 5,291,442 A | 3/1994 | Emma et al. | |
| 5,897,655 A | 4/1999 | Mallick | |
| 6,571,204 B1 | 5/2003 | Meyer | |
| 6,792,525 B2* | 9/2004 | Mukherjee et al. | 712/244 |
| 7,353,365 B2 | 4/2008 | Mukherjee et al. | 712/218 |
| 7,849,387 B2* | 12/2010 | Biswas et al. | 714/799 |
| 2001/0034827 A1 | 10/2001 | Mukherjee et al. | |
| 2002/0023202 A1* | 2/2002 | Mukherjee | 712/225 |
| 2005/0050386 A1 | 3/2005 | Reinhardt et al. | |
| 2007/0277023 A1* | 11/2007 | Weiberle et al. | 712/229 |
| 2008/0040551 A1 | 2/2008 | Gray et al. | |
| 2008/0059765 A1 | 3/2008 | Svendsen et al. | |
| 2008/0282116 A1* | 11/2008 | Wang et al. | 714/48 |

OTHER PUBLICATIONS

Parashar et al. "SlicK: Slice-based Locality Exploitation for Effcient Redundant Multithreading" Operating Systems Review, {Oper-Syst-Rev-USA}, Dec. 2006, vol. 40, No. 5, p. 95-105.*

(Continued)

*Primary Examiner* — Jacob A Petranek
(74) *Attorney, Agent, or Firm* — Trop, Pruner & Hu, P.C.

(57) ABSTRACT

In one embodiment, the present invention includes a method for controlling redundant execution such that if an exceptional event occurs, the redundant execution is stopped, non-redundant execution is performed in one of the threads until the exceptional event has been-resolved, after which a state of the threads is synchronized, and redundant execution is continued. Other embodiments are described and claimed.

12 Claims, 5 Drawing Sheets

(56) References Cited

OTHER PUBLICATIONS

Rashid et al. "Exploiting Coarse-Grain Verification Parallelism for Power-Efficient Fault Tolerance" Parallel Architectures and Compilation Techniques, 2005. PACT 2005. Issue Date: Sep. 17-21, 2005 on pp. 315-325.*

Mukherjee et al. "Detailed Design and Evaluation of Redundant Multithreading Alternatives" Proceedings of the 29.sup.th Annual International Symposium on Computer Architecture, Anchorage, AK, May 25-29, 2002, pp. 99-110.*

Tanenbaum, Andrew. "Structured Computer Organization" Second Edition, Prentice-Hall, Inc. 1984.*

U.S. Appl. No. 12/317,801, filed Dec. 30, 2008 entitled "Obtaining Data for Redundant Multithreading (RMT) Execution," by Glenn J. Hinton, et al.

Shubhendu S. Mukherjee, et al., "Detailed Design and Evaluation of Redundant Multithreading Alternatives," 2002, pp. 1-12.

Mohamed A. Gomaa, et al, "Opportunistic Transient-Fault Detection," 2005, pp. 1-12.

Angshuman Parashar, et al., "SlicK: Slice-based Locality Exploitation for Efficient Redundant Multithreading," 2006, pp. 1-11.

U.S. Patent and Trademark Office, Office Action mailed Apr. 1, 2011 and Reply filed on Jul. 1, 2011 in U.S. Appl. No. 12/317,801.

U.S. Patent and Trademark Office, Office Action mailed Sep. 28, 2011 in U.S. Appl. No. 12/317,801.

U.S. Patent and Trademark Office, Reply to Office Action Mailed Sep. 28, 2011 filed on Dec. 28, 2011 in U.S. Appl. No. 12/317,801.

U.S. Patent and Trademark Office, Final Office Action mailed Sep. 25, 2012 in U.S. Appl. No. 12/317,801.

U.S. Patent and Trademark Office, Requirement for Restriction/Election mailed Apr. 25, 2012 and Response to Restriction Requirement filed May 17, 2012 in U.S. Appl. No. 12/317,801.

* cited by examiner

CONTROLLING NON-REDUNDANT EXECUTION IN A REDUNDANT MULTITHREADING (RMT) PROCESSOR

BACKGROUND

Modern processors are vulnerable to transient faults caused by strikes from alpha particles and cosmic radiation. These faults may lead to errors in the processor's operation, known as "soft" errors since they do not reflect a permanent malfunction of the device. Strikes by cosmic ray particles, such as neutrons, are particularly noteworthy because of the absence of any practical way to protect from such strikes. The rate at which processor soft errors occur is referred to as the soft error rate (SER). Note that it is possible for some errors to corrupt data without the error being detected. The rate at which these events occur is referred to as the silent data corruption (SDC) rate.

The failure rate of a circuit is related to both the size of the transistors and the circuit supply voltage. As transistors shrink in size with succeeding technology generations, they become individually less vulnerable to cosmic ray strikes. However, this size reduction is usually accompanied by a reduction in supply voltage which increases susceptibility. Overall, decreasing voltage levels and exponentially increasing transistor counts cause chip susceptibility to increase rapidly. Additionally, error rates (measured in failures per unit time) are additive, which means that achieving a particular failure rate for a multiprocessor server requires a correspondingly lower failure rate for its associated individual processors. While possible solutions to such increasing error rates include making processor circuits less susceptible to errors, such circuit techniques cannot alleviate the problem totally, and it adds to the cost and complexity.

Similarly, fault detection support can reduce a processor's SDC rate by halting computation before faults can propagate to permanent storage. Parity, for example, is a well-known fault detection mechanism that eliminates SDC for single bit upsets in memory structures. Unfortunately, adding parity to latches or logic in a high-performance processor can adversely affect its cycle time and overall performance. Additionally, adding such codes to random logic is not straightforward and current design tools do not support such an option.

Consequently, designers have resorted to redundant execution mechanisms to detect such faults in a processor. One such mechanism is lockstepping, in which multiple cores are allocated for each program, consuming resources that could otherwise be used to boost performance, particularly in a multithreaded environment. By its very nature, both lockstepped processor cores must perform the same operation in lockstep. For example, both processors must suffer a cache miss latency or branch misprediction in lockstep, so that a checker, which checks the results generated by the lockstepped cores, does not see an output mismatch.

To make more efficient use of processor resources, another technique called Redundant Multithreading (RMT) has been proposed. RMT detects faults by running two copies of the same program as separate threads in a single core, feeding them identical inputs, and comparing their outputs. A basic RMT implementation still suffers from complexity and efficiency issues.

DETAILED DESCRIPTION

In various embodiments, processor-based mechanisms are provided to control entry/exit into/from non-redundant execution mode in the context of a remote multithreading processor. During normal RMT operation, the two hardware thread contexts in an RMT processor execute identical streams of code. Should two corresponding store or other operations differ, an error will be signaled via a given processor exception mechanism such as a machine check architecture.

However, there are situations during the execution in which exact redundant execution becomes difficult. Examples of these situations include exceptions, external interrupts (IRQs), and IO operations. In any particular micro-architecture, a set of situations may be specified as non-redundant execution (NRE) trigger events and which may be specific to the micro-architecture. These NRE trigger events may indicate a portion of code that is inappropriate for redundant execution, or at the least may raise the complexity and thus computing time for redundant execution, e.g., due to limitations of a given micro-architecture. Thus NRE mode allows a core to execute non-redundantly past a situation without the need to spend hardware resources for handling redundancy. While it is possible to execute redundantly through most exceptions, complexities can be encountered. Thus a very small amount of error coverage may be sacrificed to avoid such complexity.

When one of these situations occurs, a switch is triggered from redundant mode to non-redundant mode. According to various embodiments, when an NRE trigger is encountered, a core on which the redundant execution is performed enters non-redundant execution mode. This mode allows the core to continue executing code in a primary thread until the exceptional condition is resolved, and then overwrites a redundant thread's state with the primary thread's state before resuming redundant execution. Note that not all NRE trigger situations are synchronous with instruction retirement. In various embodiments, primary thread instructions executed without a redundant copy may be marked as non-redundant in order to allow for correct structure entry deallocation (such as one or more instruction resources) and to inhibit cross-thread checking. The process of re-initializing the redundant thread is referred to as thread re-synchronization.

In some implementations NRE triggers may be as a result of conditions other than an exceptional event. For example, for performance or other reasons, an NRE trigger may occur, such as for situations in which it is anticipated that numerous entries into and out of redundant mode may occur. In some implementations various instructions may be provided to enable entry into and exit from redundant mode. Such instructions can be user-level instructions, e.g., of a given processor's instruction set architecture. In other implementations, an OS may generate privileged instructions to enable entry/exit with respect to redundant and non-redundant mode operation.

Figure 1:
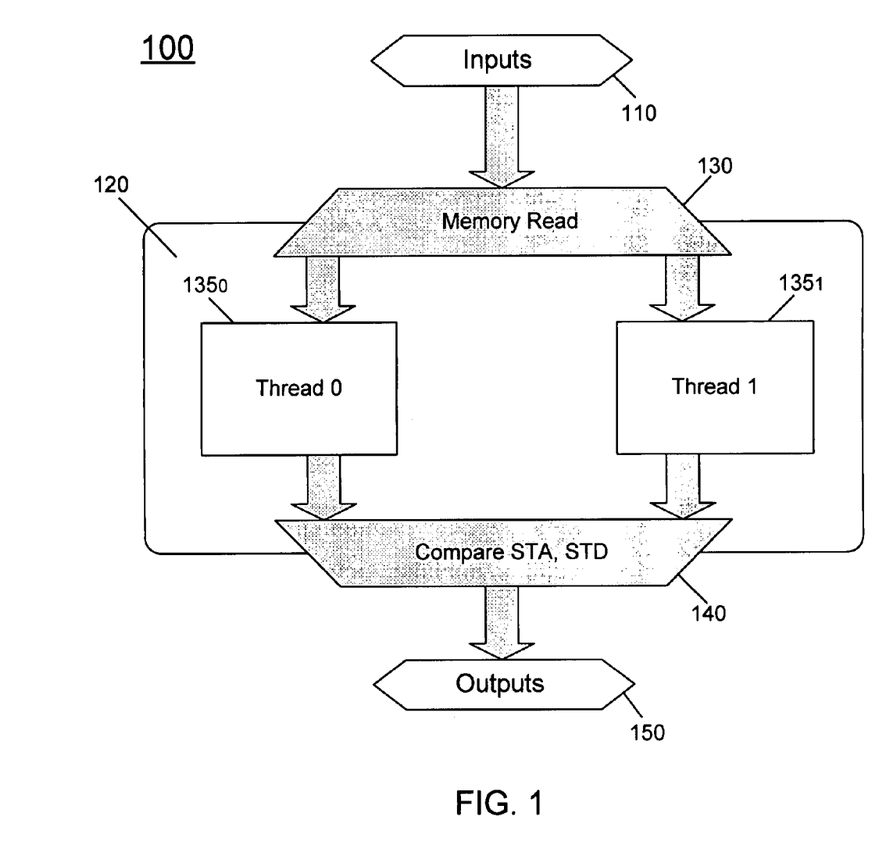
FIG. 1 is a block diagram of a redundant multithreading system in accordance with one embodiment of the present invention.

Referring now to FIG. 1, shown is a block diagram of a redundant multithreading system in accordance with one embodiment of the present invention. As shown in FIG. 1, system 100 may be a computer system that supports RMT. During program execution that is to occur in RMT mode, various inputs may be provided to a sphere of replication 120. Sphere 120 may be all or portion of a program for which redundant execution is provided. Based on inputs 110, which may be instructions for the redundant mode, memory read operations 130 may be performed. Note that in some implementations, a single memory read operation may be performed to obtain requested data from a memory system, and then the redundant thread may obtain its input values from a storage structure of the processor.

As shown in FIG. 1, multiple hardware thread contexts $135_0$ and $135_1$ (generically hardware thread contexts 135) may be present. Such hardware thread contexts may include various storage structures to store the architectural and non-architectural state associated with the given hardware context that is to be run on a processor core. In the embodiment shown in FIG. 1, thread context $135_0$ may act as the primary or first thread and thread context $135_1$ may act as the redundant or secondary thread. In general, in sphere 120 the primary thread may first execute instructions, followed by the redundant thread, which typically lags the primary thread by a slack, which may correspond to a varying number of instruction difference between the two threads. At times though the redundant thread may be the one running ahead. By operating one of the redundant threads at a slack to the first thread, improved RMT performance may be realized, as the first thread may prefetch data for the second thread. Values obtained for the first thread may also be stored in different storage structures such as a load value queue (LVQ) or an active load address buffer (ALAB) of the processor core. Typically using these structures, the redundant thread can obtain its needed values without incurring memory latency penalties.

During RMT operation, the same instructions are executed in both threads. Then a checker 140 may perform compare operations on at least certain instructions to be retired. For example, store addresses (STA) and store data (STD) may be compared for each such instruction output by both threads. If a match occurs, the result data may be retired, and continued operation may occur. However, if the values do not match, an exception may be raised. Thus outputs 150 of checker 140 may include data to be retired when the results of instructions validly match, or exceptions to indicate errors.

Figure 2:
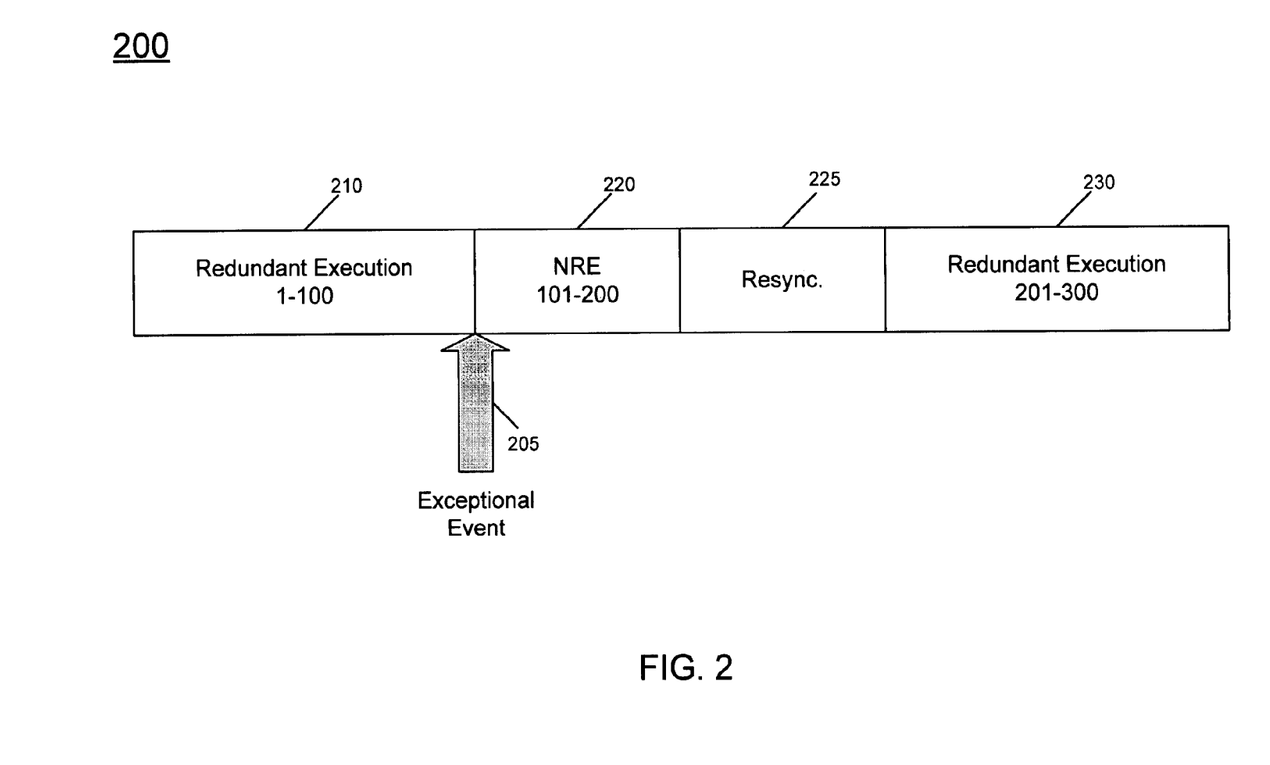
FIG. 2 is a timing diagram of operation of a RMT processor in accordance with one embodiment of the present invention.

Referring now to FIG. 2, shown is a timing diagram of operation of a RMT processor in accordance with one embodiment of the present invention. As shown in FIG. 2, during a first time frame 210, redundant execution is performed such that both hardware thread contexts execute the same instructions, namely instructions 1-100.

Then as shown in FIG. 2 at time 205, an exceptional event occurs. While the scope of the present invention is not limited in this regard, such an exceptional event may correspond to a nuke event or other such interrupt. Accordingly, this exceptional event causes generation of a NRE trigger for non-redundant execution. In one embodiment, a trigger event, e.g., a nuke may be generated in the retirement stage. As control of redundant execution can also be centralized at the retirement stage, when the nuke is detected, the retirement stage will control switching from redundant to non-redundant execution mode. Thus as shown in FIG. 2 during time frame 220 instructions are only executed in a single one of the hardware thread contexts (e.g., the primary thread).

Accordingly, the primary thread executes instructions 101-200. As examples of the NRE operation, the primary thread may execute instructions to recover from a fault or other condition that triggered the NRE mode. This NRE mode may conclude when the fault has been corrected and other optional conditions have been met, e.g., by clearing of various processor structures, re-execution of certain instructions, and the execution of further instructions of the program flow. However in some implementations, the NRE mode may continue past resolution of the exceptional event. For example, in some implementations, e.g., for a given micro-architecture one or more specific conditions may be met after resolving the exceptional event before NRE mode is concluded. In some implementations, the additional operations may include one or more instructions, such as an at retirement load instruction, that may be executed in the NRE mode prior to its conclusion.

Next, as shown in FIG. 2 a re-synchronization operation may occur at time frame 225. During this time frame, the secondary thread may be re-synchronized. More specifically, various architectural and non-architectural state of the hardware for the primary thread may be provided to the secondary thread. Note that during time frame 225 forward progress with respect to program instructions may not be realized. When the secondary thread has been properly re-synchronized, redundant execution may again occur, as shown during time frame 230, during which instructions 201-300 (for example) may be executed. While shown with this particular implementation in the embodiment of FIG. 2, the scope of the present invention is not limited in this regard.

In order to begin redundant execution, the primary thread may be stalled at a point where the architectural state of the machine is valid (generally, only the retire/commit stage is stalled). The redundant thread is stalled (possibly at the instruction fetch stage) and its micro-architectural state is reset to match that of the primary thread. As such the architectural state (including the instruction pointer (IP)) of the primary thread is used to initialize that of the redundant thread. After the redundant thread is initialized, stalls initiated to allow the synchronization are removed. Note that other combinations of stalls and sources for thread state are possible. For example, synchronization of register state can be done in hardware (e.g., via a flash or sequenced copy operation) or via micro-code, although the scope of the present invention is not limited in this regard.

During NRE mode, it is possible for the primary thread to modify various non-architectural state (e.g. control registers). However the code causing this update is not going to be executed by the redundant thread. Thus a mechanism may be provided to ensure that this change is made to the secondary thread before redundant execution is resumed. More specifically, any writes to non-register state (i.e., state not synchronized between threads at the end of NRE) while the redundant thread is stalled in NRE mode is made to both the primary and redundant threads. These updates can be made simultaneously or sequentially as long as they are completed prior to the restart of the redundant thread. In one implementation, a write to a primary thread control register in non-redundant mode may cause a flash copy to the secondary thread.

Different types of events can cause an NRE trigger. These may include events that cause an instruction to change fundamental aspects of its behavior after dispatch. For example, a normal load that changes its behavior to be an at-retirement load will cause a deadlock in RMT because the "other" thread may not experience the same behavior change. Typically these events are the result of microarchitectural limitations or protocols. These events create an exceptional condition, and will force a re-synchronization.

Another class of NRE triggers occurs when the processor first starts executing external code. This can happen immediately after reset or when the processor changes software contexts or execution modes. Since these events typically require the processor to initialize non-architectural state, embodiments may treat them as exceptional events and indicate that the RMT processor should begin operation in NRE mode. Only after the processor has begun to execute "normally" will the processor synchronize the redundant thread state and exit NRE mode.

Figure 3:
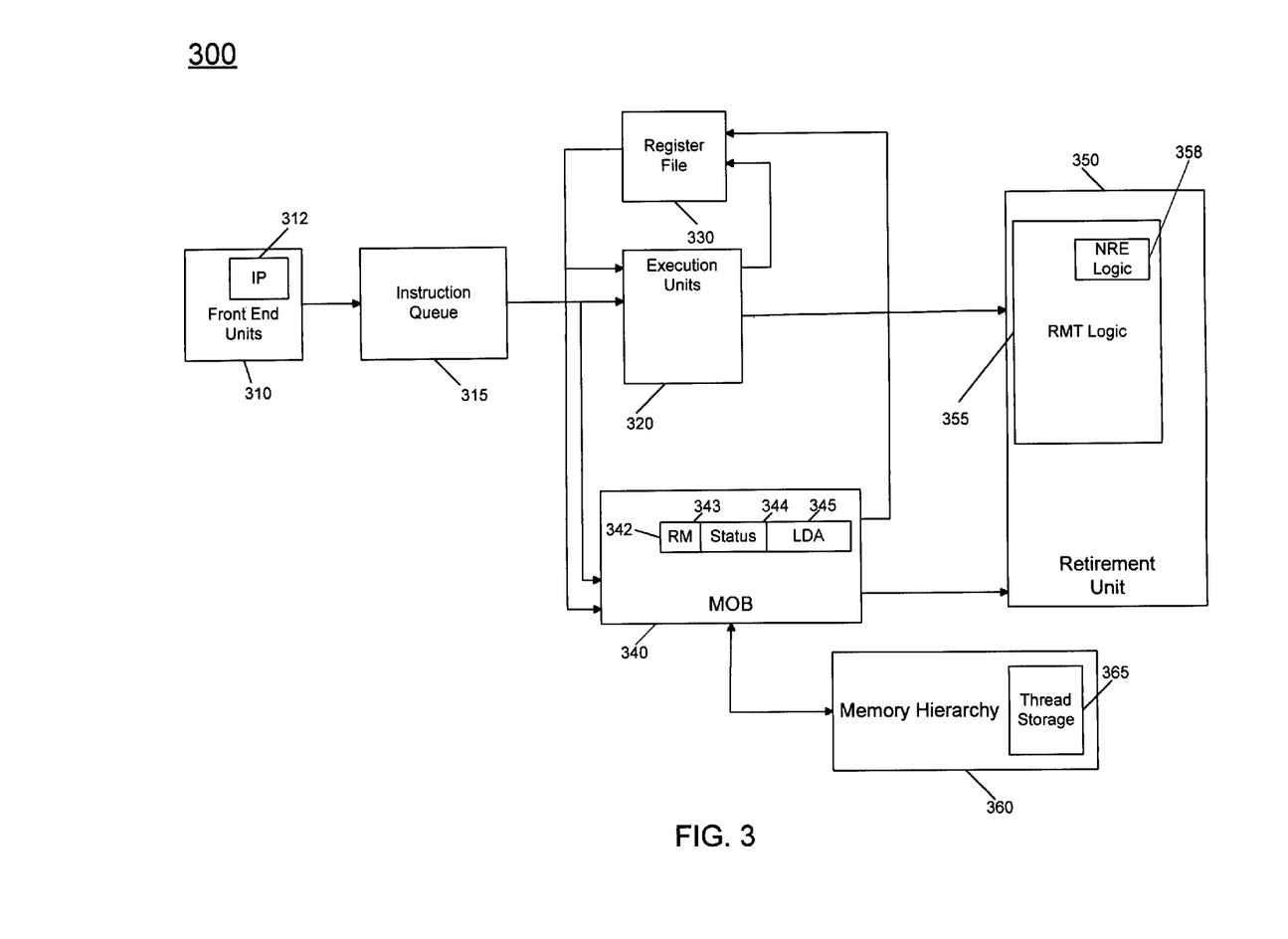
FIG. 3 is a block diagram of a processor in accordance with one embodiment of the present invention.

Referring now to FIG. 3, shown is a block diagram of a processor in accordance with one embodiment of the present invention. As shown in FIG. 3, processor 300 may be a multi-stage pipelined out-of-order processor, although embodiments may equally be used with an in-order processor. Processor 300 is shown with a relatively simplified view to illustrate various features used in connection with controlling RMT mode. As one example, only a single core is shown in the embodiment of FIG. 3, although there may be multiple cores similarly adapted.

As shown in FIG. 3, processor 300 includes front end units 310, which may be used to fetch macro-instructions to be executed and prepare them for use later in the processor. Such fetching may be based on an instruction pointer (IP) of the hardware thread. In various embodiments, each hardware thread may store its IP in an IP storage 312 in front-end units 310. For example, front end units 310 may include an instruction prefetcher, an instruction decoder, and a trace cache, along with micro-code storage as well as a micro-operation (μop) storage. The instruction prefetcher may fetch macro-instructions from memory and feed them to an instruction decoder to decode them into primitives, i.e., μops for execution by the processor. The trace cache may take decoded μops and assemble them into program ordered sequences for storage into the macro code storage.

Coupled between front end units 310 and execution units 320 is an instruction queue 315 that may be used to receive the micro-instructions and store them prior to execution. In one embodiment, instruction queue 315 may include various buffers to re-order micro-instruction flow and allocate various resources needed for execution, as well as to provide renaming of logical registers onto storage locations within various register files such as register file 330, which may include separate register files for integer and floating point values. When a given redundant thread is executing, its register values may be stored in register file 330. Various resources may be present in execution units 320, including, for example, various integer, floating point, and single instruction multiple data (SIMD) logic units, among other specialized hardware.

A memory order buffer (MOB) 340 may include control logic, a load buffer, a store buffer, and the like. As shown in the embodiment of FIG. 3, MOB 340 may include various entries 342 each including information associated with a given load or store value. In the embodiment shown in FIG. 3, entry 342 is associated with a load operation and includes an address field 345 to provide an indication of an address associated with the load operation, a status field 344 which may include various information associated with the instruction, such as its completion status, validity and so forth. In addition, a redundant mode field 343 may be present to store an indicator, e.g., a redundant mode bit, to indicate whether the associated load operation is executed during a redundant mode (or part of NRE). The information from various entries in MOB 340 may be used by a retirement unit 350. While shown as a separate unit in the embodiment of FIG. 3, understand that in various implementations a retirement stage may generally include both the logic of retirement unit 350 as well as the structures of MOB 340.

In the embodiment shown in FIG. 3, retirement unit 350, which may be used to retire instructions after they have executed, may include a RMT logic 355. Logic 355 may be used to control entry into and exit from redundant mode. More specifically, in various implementations, RMT logic 355 may further include NRE trigger logic 358 to detect an exceptional event and cause execution to switch from redundant mode to NRE mode to handle the exceptional event. Then when completion of the exceptional event has concluded, RMT logic 355 may cause re-synchronization between the multiple threads and enable continued operation of redundant mode.

As further shown in FIG. 3, a memory hierarchy 360 may be coupled to MOB 340, as shown in FIG. 3. The memory hierarchy may include both on-chip cache as well as an off-chip cache memory, a system memory such as a dynamic random access memory (DRAM), and mass storage such as a hard drive.

As further shown in FIG. 3, memory hierarchy 360 may store at least a part of the hardware thread contexts for the redundant threads. Specifically as shown in FIG. 3, a portion 365 of cache memory 360 may store the memory values for the redundant threads. In general, thread state is made up of the instruction pointer, register values, and memory values. As described above, the instruction pointer and register values are stored inside the core, while memory values can be stored in locations throughout the memory hierarchy. For one embodiment, the two redundant threads share one copy of the memory values, but maintain separate instruction pointers and register values. When, however, the redundant thread is not executing, its instruction pointer and register values are essentially useless, since they are not up to date (and probably not correct with respect to the other thread due to the exceptional condition), and as such they are not actually stored anywhere when not executing. Instead, these values will be replaced when the threads are synchronized at the end of NRE. While shown with this particular implementation in the embodiment of FIG. 3, the scope of the present invention is not limited in this regard.

Figure 4:
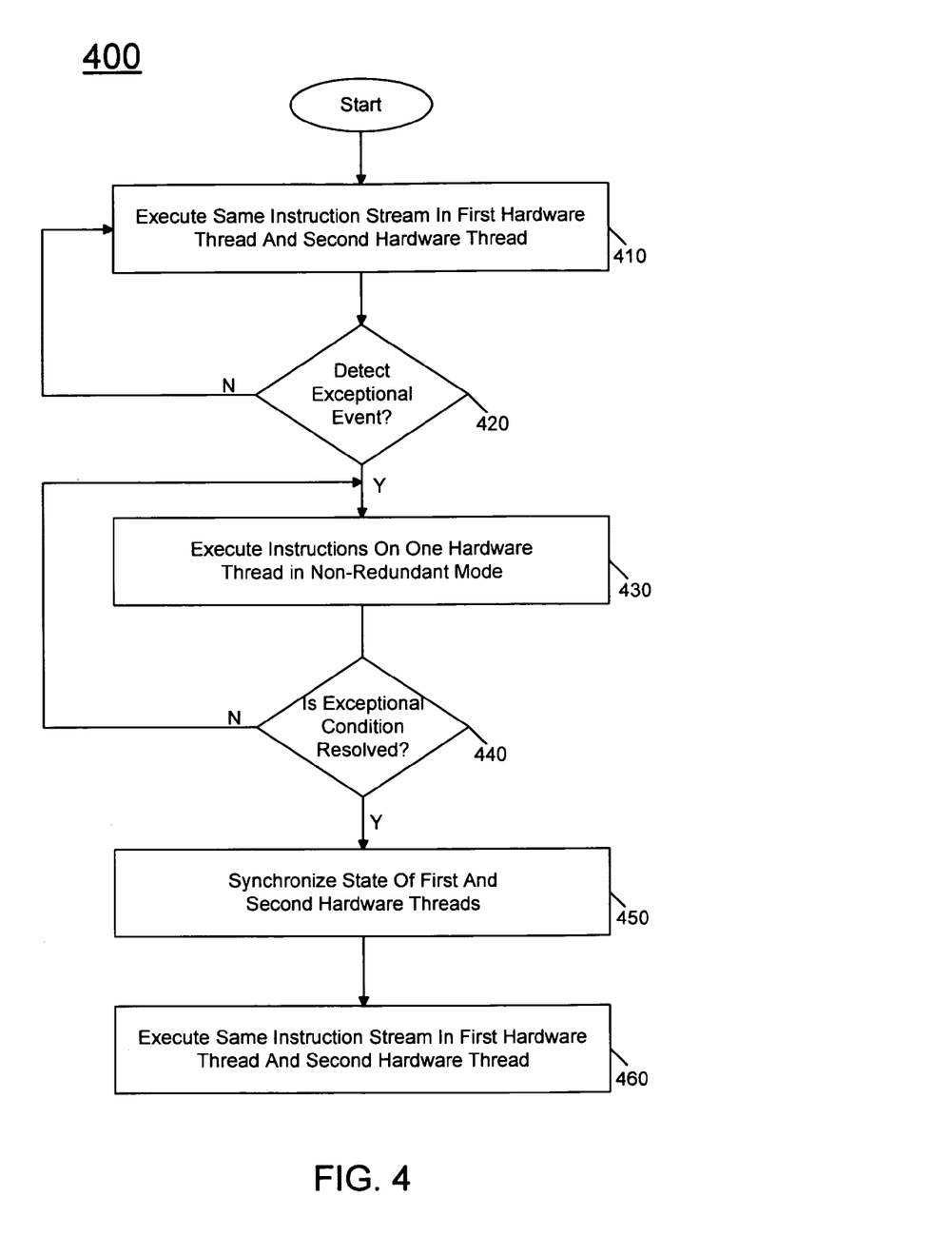
FIG. 4 is a flow diagram of a method in accordance with one embodiment of the present invention.

Referring now to FIG. 4, shown is a flow diagram of a method in accordance with one embodiment of the present invention. As shown in FIG. 4, method 400 may begin by executing the same instruction stream in first and second hardware threads (block 410). For example, in a multi-threaded processor a single core may execute the same instruction streams in the two hardware threads. In some implementations, control of redundant execution may be via logic of a retirement unit, which may allow the processor to selectively control entry into and exit from redundant mode based, at least in part on micro-architectural specific scenarios.

Still referring to FIG. 4, during execution of the instructions in one of the threads it may be determined whether an exceptional event is detected (diamond 420). If not, redundant execution continues. If instead an exceptional event is detected control passes to block 430 where instructions are executed on one hardware thread in a non-redundant mode. In one embodiment, the hardware thread may be the first hardware thread that corresponds to a primary thread. Note that the instructions executed in non-redundant mode may be different from the instructions performed in redundant mode and may be used to recover or otherwise resolve an exceptional condition that caused the triggering of the exceptional event, in addition to other program instructions.

Referring still to FIG. 4, next it may be determined whether the exceptional condition has been resolved (diamond 440). If not, non-redundant execution continues. When the exceptional condition is resolved, a state of the first thread may be synchronized with that of the second thread (block 450). Accordingly, at this time continued execution of the same instructions in both threads may occur (block 460). While the scope of the present invention is not limited in this regard, in an example in which the exceptional event is a nuke operation, NRE may be terminated when an instruction following the nuked instruction is ready to retire. Note that the instructions executed in block 460 may be different than those discussed above in block 410, i.e., additional instructions of a program that are encountered after the exceptional condition has been resolved. While shown with this particular implementation in the embodiment of FIG. 4, the scope of the present invention is not limited in this regard.

Figure 5:
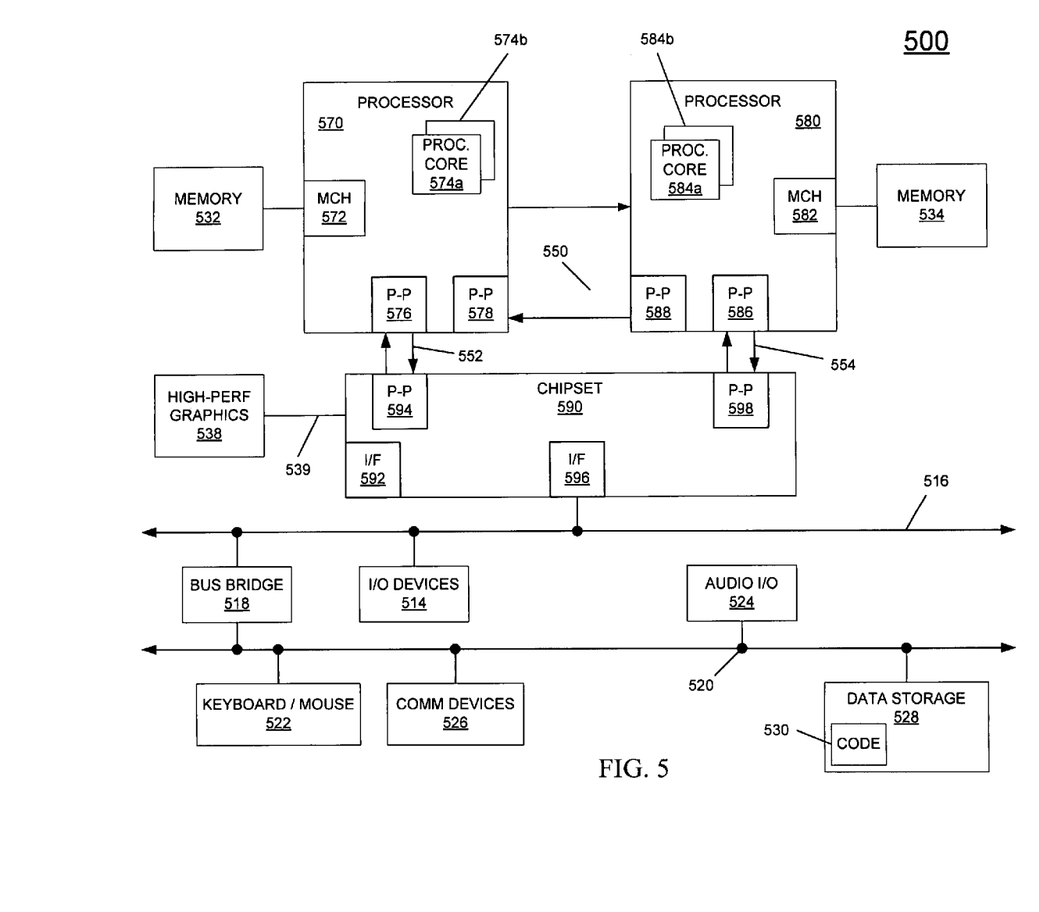
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each such processor may include private cache memories, including hardware, software and firmware to perform RMT according to embodiments of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
an execution unit to execute instructions;
an order buffer having a plurality of entries each including an address field to store an address associated with an operation, a redundant mode field to store a redundant mode indicator to indicate whether the operation is to be executed during a redundant execution mode, the redundant mode indicator a single bit which, when a first value to indicate the redundant execution mode and when a second value to indicate a non-redundant execution mode, and a status field to store status information associated with the operation; and
a retirement unit to retire the executed instructions, the retirement unit comprising logic to control entry into and exit from the redundant execution mode, wherein the processor is to redundantly execute first instructions of a program in a first thread and a second thread in the redundant execution mode under control of the logic, wherein the logic is to terminate the redundant execution mode when the retirement unit detects an exceptional event, generate a trigger event for the non-redundant execution mode to control switching from the redundant execution mode to the non-redundant execution mode, cause only the first thread to execute second instructions of the program to resolve an exceptional condition associated with the exceptional event and to continue execution of the second instructions past resolution of the exception condition until a specific condition is met, synchronize a state of the first thread and a state of the second thread after the second instructions, and redundantly execute third instructions of the program in the first and second threads in the redundant execution mode, the third instructions different than the first and second instructions.

2. The processor of claim 1, wherein the logic is to cause the first thread to execute the second instructions, wherein the first thread is a primary thread.

3. The processor of claim 2, wherein the logic is to trigger the non-redundant execution mode upon detection of the exceptional condition.

4. The processor of claim 3, wherein the logic is to determine that the exceptional condition is resolved.

5. The processor of claim 1, wherein the logic is to set the redundant mode if the operation was executed in the redundant execution mode.

6. The processor of claim 1, wherein the processor is to mark instructions executed in the non-redundant execution mode with a non-redundant indicator to prevent cross-thread checking of results of the non-redundantly executed instructions.

7. The processor of claim 1, wherein the processor is a multithreaded processor and the first thread and the second thread are to execute on a core of the multithreaded processor.

8. The processor of claim 7, wherein the processor is to copy a register file of the first thread to a register file of the second thread to synchronize the thread states, and if a portion of non-register architectural state of the first thread is modified in the non-redundant execution mode, copy the portion of the non-register architectural state of the first thread to the second thread.

9. The processor of claim 1, wherein the redundant execution mode termination is to occur responsive to a user-level instruction of an instruction set architecture (ISA) that enables the redundant execution mode termination.

10. The processor of claim 1, wherein the redundant execution mode termination is to occur responsive to a privileged instruction of an instruction set architecture (ISA) that enables the redundant execution mode termination.

11. A system comprising:
 a multi-core processor including at least a first core and a second core, wherein the first core includes at least one execution unit and retirement logic to retire a first set of instructions of a program executed in a first thread and a second redundant thread in a redundant execution mode in the first core, the first core to, responsive to a first user-level redundant mode exit instruction of an instruction set architecture (ISA), exit from the redundant execution mode, perform non-redundant execution in a non-redundant execution mode of a second set of instructions of the program in only the first thread until receipt of a second user-level redundant mode entry instruction of the ISA to enter into the redundant execution mode, synchronize a state of the first thread and the second redundant thread, and perform continued redundant execution of a third set of instructions of the program in the first thread and the second redundant thread in the redundant execution mode, wherein the first core includes an order buffer to store information associated with an operation, the information including a redundant indicator comprising a single bit having a given one of a first value to indicate that the operation was executed in the redundant execution mode and a second value to indicate that the operation was executed in the non-redundant execution mode; and
 a dynamic random access memory (DRAM) coupled to the multi-core processor.

12. The system of claim 11, wherein the first core is to set the redundant indicator if the operation was executed in the redundant execution mode.

* * * * *